H. D. COOK.
PLATE PILING MECHANISM.
APPLICATION FILED AUG. 25, 1915.
1,210,274.
Patented Dec. 26, 1916.
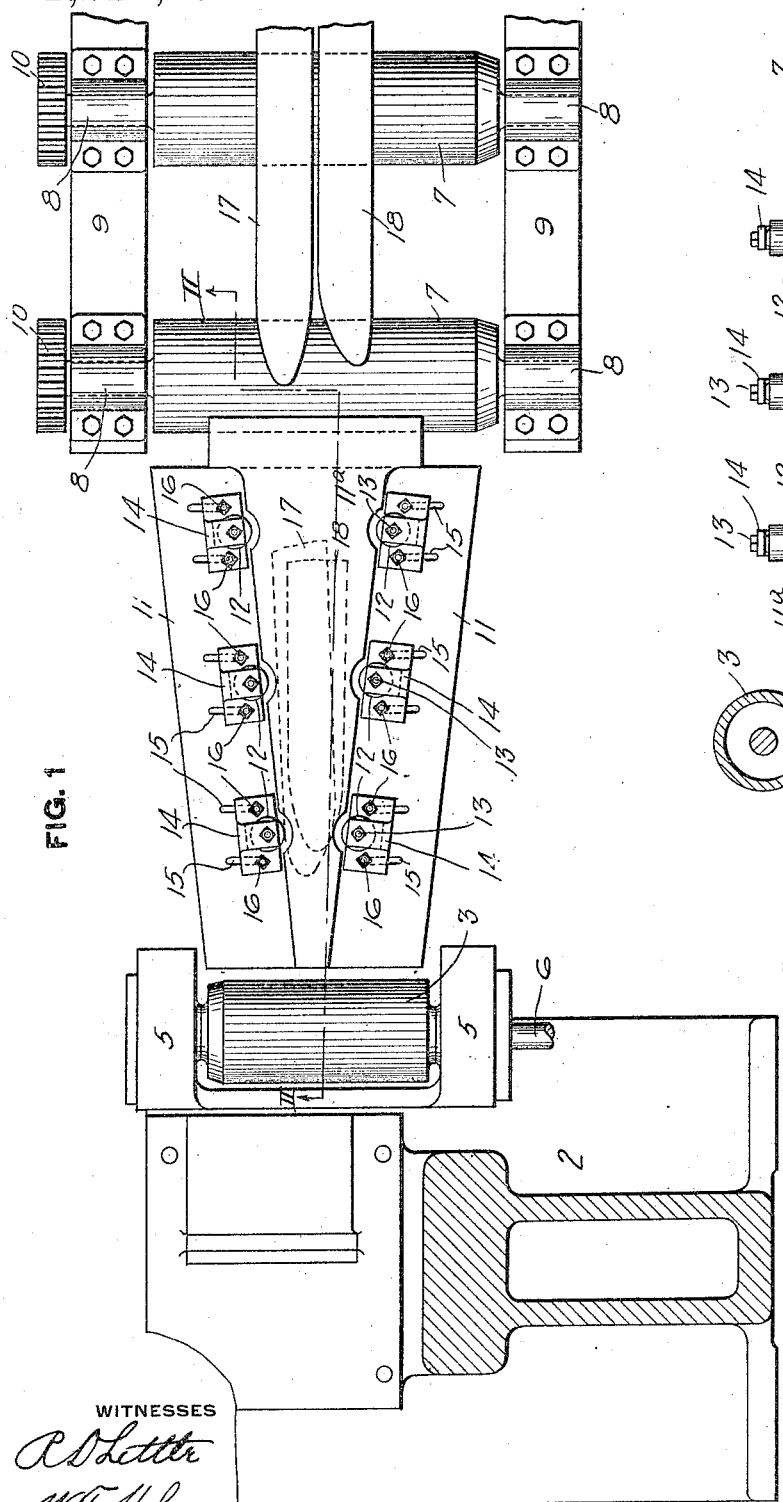
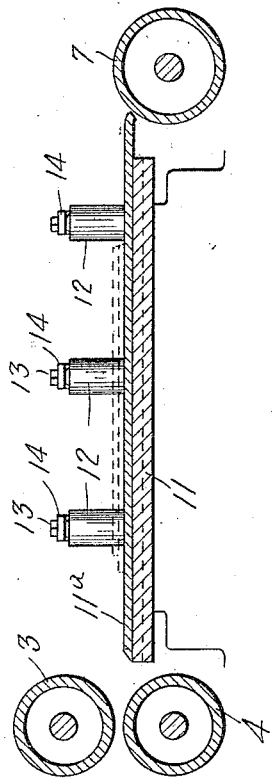
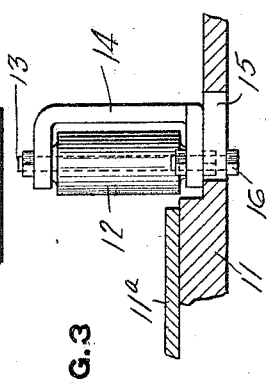
WITNESSES
INVENTOR
H. D. Cook

UNITED STATES PATENT OFFICE.

HOWARD D. COOK, OF LORAIN, OHIO.

PLATE-PILING MECHANISM.

1,210,274.    Specification of Letters Patent.    Patented Dec. 26, 1916.

Application filed August 25, 1915. Serial No. 47,322.

*To all whom it may concern:*

Be it known that I, HOWARD D. COOK, a citizen of the United States, residing at Lorain, in the county of Lorain, and State of Ohio, have invented certain new and useful Improvements in Plate-Piling Mechanisms, of which the following is a specification.

This invention relates to means employed in handling thin, flat, flexible rolled metal products such as pipe skelp, sheet and tin bars, universal plates and similar materials of considerable length and relatively narrow width, in piling two or more pieces or lengths of such materials, one on top of another, and the invention more particularly relates to piling such rolled metal materials one on another, to enable a plurality of pieces of such materials to be sheared simultaneously to length or into a series of short pieces of predetermined or measured length.

Pipe skelp, sheet and tin bars, universal plates and like rolled materials are rolled, in modern rolling mills, in pieces of very great length, and much longer than is usable in fabricating the rolled plates or materials into other articles. In addition to cropping the ends of such materials after the rolling operation, it is also necessary to cut the rolled material into several shorter pieces, while in the case of sheet and tin bars, the multiple length bars formed in rolling are cut up into a multiplicity of small pieces of small length in preparation for rolling on hot mills into sheets and plates.

One object of my invention is to provide a piling mechanism of improved construction having novel means whereby two or more pipe skelp, multiple length tin or sheet bars, or similar long, thin, flexible materials are automatically piled one on top of the other or others while the materials are being moved lengthwise on a roller feed table or equivalent conveyer into position to be sheared or cut to length.

Another object of this invention is to provide a piling mechanism having means whereby a plurality of pieces of thin flexible rolled material are mechanically assembled into position enabling a plurality of pieces of such material being sheared transversely of the length thereof with a shear having cutting knives or shear blades of less width than the combined width of two pieces of the materials being sheared or severed.

A further object of the invention is the provision of a piling mechanism having means for automatically piling two or more pieces of rolled plates, pipe skelp or similar materials mechanically and without the necessity of manual labor whereby the time required in shearing a given quantity of such material is materially lessened and whereby the shearing cost is reduced to a minimum.

A still further object of my invention is the provision of the novel combination and arrangement of parts shown in the drawings, to be more fully described hereinafter and to be specifically pointed out in the appended claims.

Referring now to the drawings forming part of this specification Figure 1 is a plan showing a piling mechanism constructed and arranged and adapted for use in connection with a shear and roller feed table in accordance with my invention. Fig. 2 is a sectional side elevation of the piling mechanism of Fig. 1, the section being taken on the line II—II of Fig. 1. Fig. 3 is a sectional end elevation showing the construction of the vertical rollers forming part of my improved piling mechanism.

In the accompanying drawings, the numeral 2 designates a shear of the type having shear knives which are relatively movable vertically. Positioned at the rear or entrance side of the shear is a pair of horizontal pinch rollers 3, 4 by which the piled skelp or plates are fed forwardly between the shear knives into position for the severing or shearing operations. The pinch rollers 3 and 4 are relatively movable in the bearings 5, therefor to suit the conditions imposed by the combined thickness of the piled bars and at least one of the pinch rollers is positively driven in the usual known manner by a suitable motor (not shown) operatively connected to the roller shaft 6.

Located behind the shear 2, at a suitable distance in the rear of the pinch rollers 3 and 4 is a feed roller table or conveyer of the usual construction having feed rollers 7, rotatably mounted in bearings 8, 8 on the sides 9, 9 of the feed table. The roller shafts are provided with spur driving gears 10 through which the feed rollers 7 are positively driven, to deliver the pipe skelp, sheet or tin bars or other material being rolled lengthwise, while lying side by side on the rollers 7 which is the position in which the materials are delivered to the conveyer formed by the feed roller table.

Positioned between the pinch rollers 2 and 3 and the end roller 7 of the feed table, with its ends secured to the supports for the pinch rollers and the rollers of the feed table, is an apron plate 11 having a wearing plate 11ª and mounted on each side of this apron plate 11 to extend above the apron plate is a series of anti-friction rollers 12. The rollers 12 are arranged to rotate freely on pins or shafts 13 which are secured at their ends in bracket bearings 14 and these bracket bearings are bolted to the apron plate so that the apron plate 11 is adjustable toward and away from the opposite roller, on the other side of the apron plate. As shown slotted openings 15 in the apron plate for the securing bolts 16 afford means enabling the necessary adjustment of the bracket bearings 12 and rollers 11 to be made.

As will be seen in Fig. 1, the path defined by vertical planes tangent with the opposite peripheral surfaces of the vertical rollers 12 is tapering and converges toward the pinch rollers 3 and 4 and the pair of opposite rollers 12 nearest the pinch rollers 3, 4 are adjusted a distance apart equal to or slightly greater than the width of the particular size of pipe skelp or bars 17, 18, being rolled and to be sheared, while the end pair of opposite rollers 12 nearest the adjoining end of the feed table or conveyer formed by the rollers 7 are separated a distance equal to or substantially equal to the combined width of two, three or more of the bars being rolled. The opposite pairs of the intermediate rollers 11 are set a distance apart so that the periphery of these rollers will tangent straight lines drawn tangent with the surfaces of the rollers 12 at the ends of the apron plate 11.

In the operation of my improved mechanism, the pipe skelp 17—18 which are delivered upon the rollers 7 of the feed table or conveyer while lying side by side as shown in full lines in Fig. 1, are caused to travel endwise by rotating the feed rollers 7. As the front ends of the skelp 17 and 18 contact with the first of the pairs of vertical rollers 12 they are moved sidewise and as the front ends advance the skelp 17, 18 are gradually pushed sidewise until they overlap. The skelp, being thin and flexible, one will be lifted by contact with the edge of the other and by engagement with the vertical rollers 12 and lifted so as to be gradually moved sidewise in the continued lengthwise movement thereof so that when the forward ends of the skelp reach a position between the pinch rollers 3, 4 the two or more skelp 17, 18 will be piled one on another so as to move as a unit in further endwise movement. In the further lengthwise movement of the now piled materials, which movement is controlled by the intermittently rotated pinch rollers 3 and 4, the piled skelp are brought into the successive shearing positions necessary to crop and cut the materials into pieces of the desired length. The skelp being piled one on another, each shearing operation severs a plurality of pieces of skelp so that the time required in cutting the materials into sheared lengths is greatly lessened. The above described operations are then repeated with succeeding lots of the materials.

The advantages of my invention will be apparent to those skilled in the art. Instead of piling the skelp by hand, which is slow and expensive, the skelp are automatically piled one on another into position to be simultaneously cut to length while being moved into position to be sheared. By piling the skelp one on top of another, a series of the skelp will be cut to length in the same time interval required in shearing a single skelp while the simultaneous shearing of the series of bars may be accomplished with a shear having knives of less width than the combined width of two pieces of the material being sheared.

The apparatus is simple and easily kept in repair.

Modifications in the construction and arrangement of the parts may be made without departing from my invention as defined in the appended claims.

I claim:

1. A skelp piling mechanism comprising in combination means for moving a plurality of pipe skelp lengthwise side by side, and a series of sets of axially vertical rotatable rollers forming a converging path and arranged to engage the edges of the lengthwise moving skelp to thereby move said skelp sidewise and pile one on another during the lengthwise movement thereof.

2. A skelp piling mechanism comprising in combination means for moving a plurality of pipe skelp lengthwise side by side, a series of sets of axially, vertical rotatable rollers forming a converging path and arranged to engage the edges of the lengthwise moving skelp to thereby move said skelp sidewise and pile one on another during the lengthwise movement thereof, and means for adjusting said rollers to vary the angle and width of said converging path.

3. A skelp piling mechanism comprising a series of sets of axially vertical, rotatable rollers arranged to engage the edges of a plurality of lengthwise moving pipe skelp, said sets of rollers being arranged to form a converging path for the lengthwise moving skelp and by engagement therewith move the lengthwise traveling skelp sidewise into overlapping engagement and pile the skelp one on another in the lengthwise movement thereof.

4. A skelp piling mechanism comprising a series of sets of axially vertical, rotatable rollers arranged to engage the edges of a plurality of lengthwise moving pipe skelp, said sets of rollers being arranged to form a converging path for the lengthwise moving skelp and by engagement therewith move the lengthwise traveling skelp sidewise into overlapping engagement and pile the skelp one on another in the lengthwise movement thereof, and means for moving said pipe skelp lengthwise into engagement with said rollers.

5. A skelp piling mechanism comprising a series of sets of axially vertical, rotatable rollers arranged to engage the edges of a plurality of lengthwise moving pipe skelp, said sets of rollers being arranged to form a converging path for moving the lengthwise traveling skelp into overlapping engagement and pile the skelp one on another, and means for adjusting said vertical rollers to vary the angle and width of said converging path.

6. A piling mechanism comprising in combination a roller feed table arranged to transfer a plurality of pipe skelp side by side thereon, pinch rollers for delivering said skelp to a shear, and tapering means converging toward the pinch rollers whereby the skelp are moved sidewise until resting one on top of another while moving forwardly lengthwise between the roller feed table and said pinch rollers.

In testimony whereof I have hereunto set my hand.

HOWARD D. COOK.

Copies of this patent may be obtained for five cents each, by addressing the "Commissioner of Patents, Washington, D. C."